US012663941B2

(12) United States Patent　(10) Patent No.:　US 12,663,941 B2
Park et al.　(45) Date of Patent:　Jun. 23, 2026

(54) HOST DEVICE FOR CONTROLLING READ-AHEAD OPERATION, METHOD OF OPERATING HOST DEVICE, AND COMPUTING SYSTEM INCLUDING HOST DEVICE

(71) Applicant: SK hynix Inc., Gyeonggi-do (KR)

(72) Inventors: Chi Je Park, Gyeonggi-do (KR);
Seung Soo Kim, Gyeonggi-do (KR);
Hyeong Jae Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 33 days.

(21) Appl. No.: 18/586,570

(22) Filed: Feb. 26, 2024

(65) Prior Publication Data

US 2025/0117161 A1　Apr. 10, 2025

(30) Foreign Application Priority Data

Oct. 5, 2023　(KR) ......................... 10-2023-0132692

(51) Int. Cl.
*G06F 3/06*　(2006.01)

(52) U.S. Cl.
CPC ............ *G06F 3/0659* (2013.01); *G06F 3/061* (2013.01); *G06F 3/0673* (2013.01)

(58) Field of Classification Search
CPC ....... G06F 3/061; G06F 3/0659; G06F 3/0673
See application file for complete search history.

(56) References Cited

U.S. PATENT DOCUMENTS

| 10,146,448 B2 * | 12/2018 | Kotte | ..................... G06F 3/0616 |
| 2013/0232366 A1 * | 9/2013 | Nishijima | ............. G06F 1/3275 |
| | | | 713/324 |
| 2024/0345774 A1 * | 10/2024 | Sano | ..................... G06F 3/0604 |

FOREIGN PATENT DOCUMENTS

| KR | 10-2015-0055413 A | 5/2015 |
| KR | 10-2022-0154612 A | 11/2022 |

* cited by examiner

*Primary Examiner* — Yong J Choe
(74) *Attorney, Agent, or Firm* — IP & T GROUP LLP

(57)　ABSTRACT

Provided herein is a method of operating a host device. The method may include, a determining that read requests for data in a first file are successive, in response to the determination that read requests are successive, generating a first read command that instructs second data to be read ahead, the second data being successive to first data, determining a logical address corresponding to the first read command, providing to a storage device the first read command and the logical address, determining whether a read-ahead request for the first file has been completed, based on a first file pointer and a first offset corresponding to a storage area within the storage device in which the first file is stored, and executing a read-ahead request for a second file in response to the determination that the read-ahead request for the first file has been completed.

9 Claims, 9 Drawing Sheets

Figure 4:
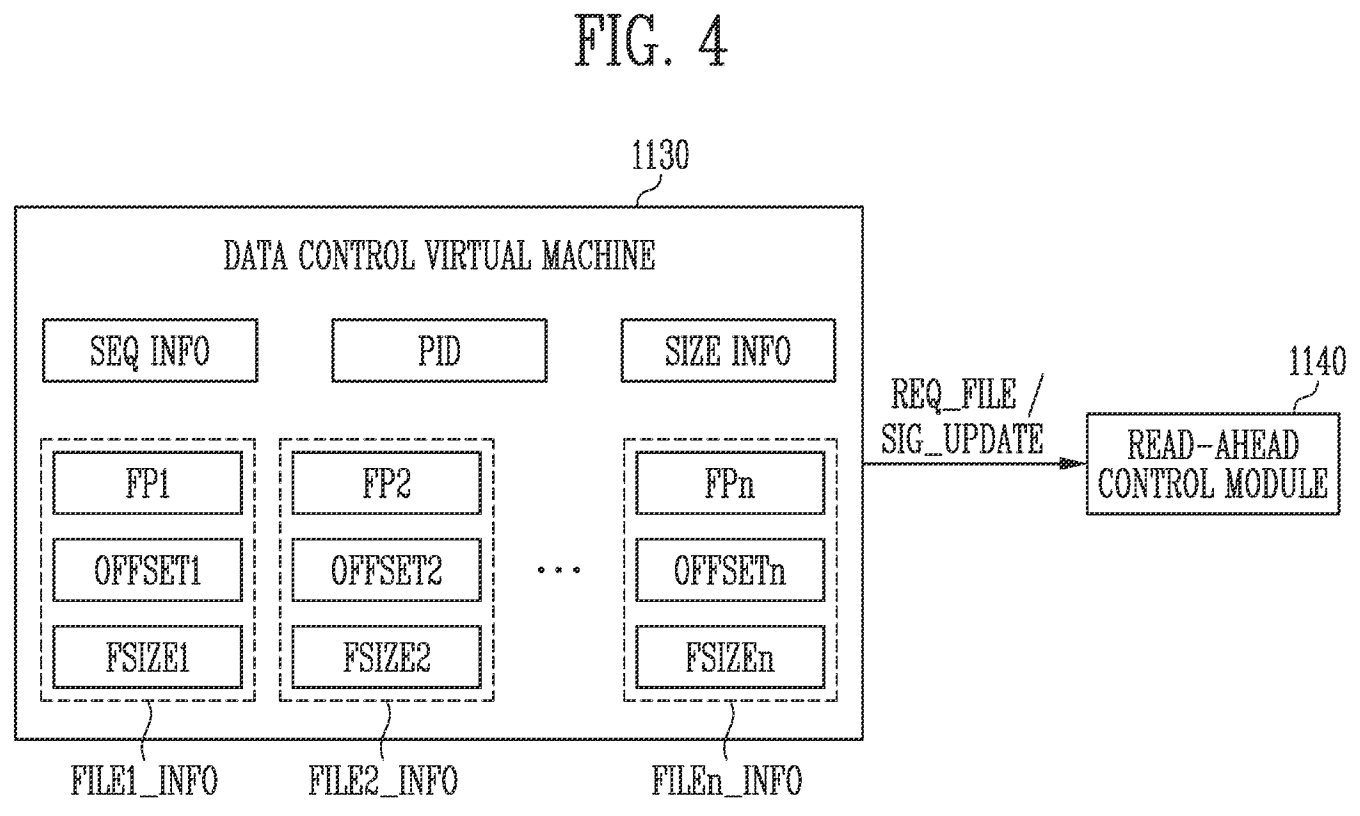

DATA CONTROL VIRTUAL MACHINE — 1130

| SEQ INFO | PID | SIZE INFO |

FILE1_INFO:
- FP1
- OFFSET1
- FSIZE1

FILE2_INFO:
- FP2
- OFFSET2
- FSIZE2

FILEn_INFO:
- FPn
- OFFSETn
- FSIZEn

REQ_FILE / SIG_UPDATE

READ-AHEAD CONTROL MODULE — 1140

HOST DEVICE FOR CONTROLLING READ-AHEAD OPERATION, METHOD OF OPERATING HOST DEVICE, AND COMPUTING SYSTEM INCLUDING HOST DEVICE

CROSS-REFERENCE TO RELATED APPLICATION

The present application claims priority under 35 U.S.C. § 119 (a) to Korean patent application number 10-2023-0132692 filed on Oct. 5, 2023, the entire disclosure of which is incorporated by reference herein.

BACKGROUND

1. Technical Field

Various embodiments of the present disclosure generally relate to a semiconductor device, and more particularly to a host device for controlling a read-ahead operation, a method of operating the host device, and a computing system including the host device.

2. Related Art

A storage device may be a device in which data is stored. The data stored in the storage device may be loaded into a memory in response to a read request received from a host device, and the host device may execute an application based on the data loaded into the memory.

The host device may read ahead (pre-read) data stored in the storage device and load the data into the memory based on a read-ahead operation before a data request is received from the application. The read-ahead operation may be performed only within a single file, or may be performed depending on the size designated by a kernel. However, in order to improve the efficiency of a read-ahead operation, the size of a target file or data to be read needs to be expanded.

SUMMARY

Various embodiments of the present disclosure are directed to a host device, a method of operating the host device, and a computing system including the host device, which can perform a read-ahead operation on successive files.

Various embodiments of the present disclosure are directed to a host device, a method of operating the host device, and a computing system including the host device, which can control the size of data to be read depending on a read-ahead operation.

An embodiment of the present disclosure may provide for a method of operating a host device. The method may include, a determining that read requests for data in a first file among a plurality of files stored in a storage device are successive, in response to the determination that read requests are successive, generating a first read command that instructs second data to be read ahead, the second data being successive to first data corresponding to the read requests among pieces of data in the first file, determining a logical address corresponding to the first read command, providing to a storage device the first read command and the logical address, determining whether a read-ahead request for the first file has been completed, based on a first file pointer and a first offset which correspond to a storage area within the storage device in which the first file is stored, and executing a read-ahead request for a second file among the plurality of files in response to the determination that the read-ahead request for the first file has been completed.

An embodiment of the present disclosure may provide for a computing system. The computing system may include a storage device configured to store a plurality of files related to an application and output data related to at least one of the plurality of files in response to a read command, and a host device configured to temporarily store the data output from the storage device and execute the application based on the data, wherein the host device is configured to, in response to a sequential read request for a first file among the plurality of files, provide the storage device with a first read command and a second read command, and wherein the first read command instructs data in the first file to be read ahead based on information related to the application, and the second read command instructs data in a second file successive to the first file among the plurality of files to be read ahead.

Other features, aspects, and advantages of the embodiments of the present disclosure will become apparent from the following detailed description, the drawings, and the claims.

BRIEF DESCRIPTION OF THE DRAWINGS

FIG. 3 is a diagram for describing a read-ahead operation according to an embodiment of the present disclosure.

FIG. 4 is a diagram illustrating a data control virtual machine according to an embodiment of the present disclosure.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
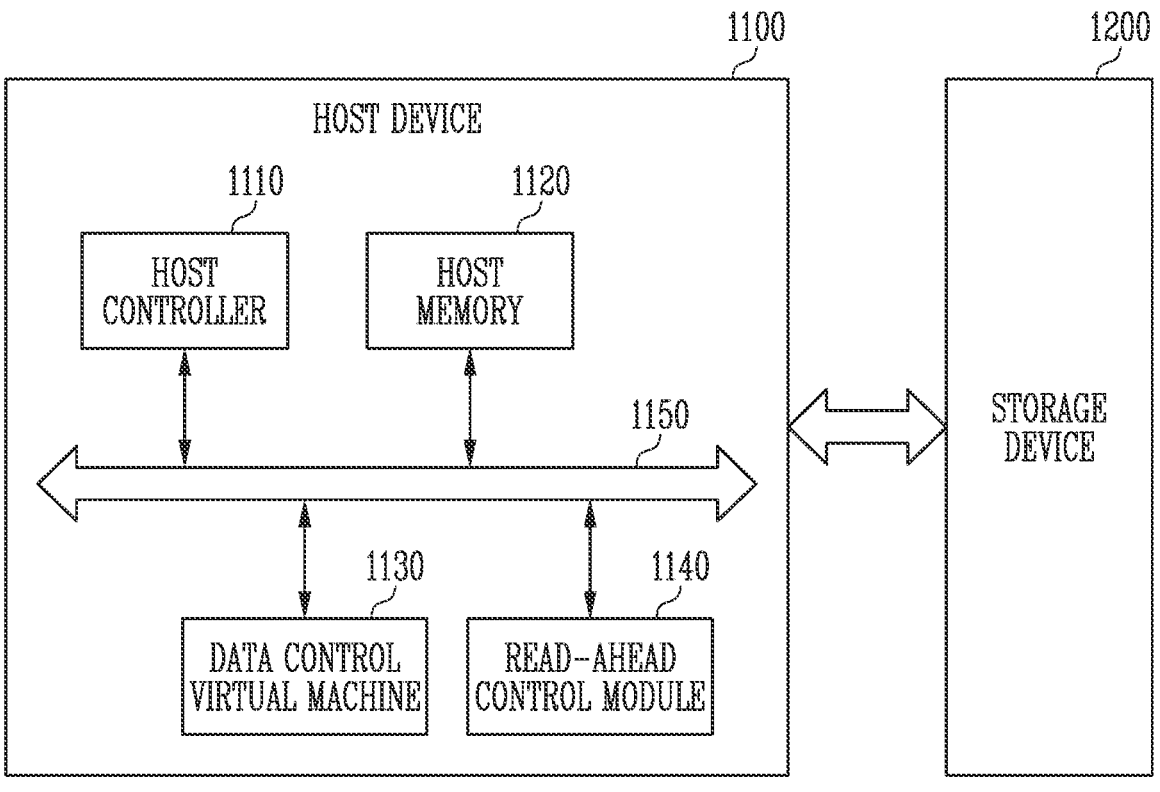
FIG. 1 is a diagram illustrating a computing system according to an embodiment of the present disclosure.

FIG. 1 is a diagram illustrating a computing system 1000 according to an embodiment of the present disclosure.

Referring to FIG. 1, the computing system 1000 may include a host device 1100 and a storage device 1200.

The host device 1100 may store data in the storage device 1200, or may read data stored in the storage device 1200. The host device 1100 may include a host controller 1110, a host memory 1120, a data control virtual machine 1130, and a read-ahead control module 1140. The host controller 1110, the host memory 1120, the data control virtual machine 1130, and the read-ahead control module 1140 may communicate with each other through an internal communication bus 1150.

The host controller 1110 may control the overall operation of the host device 1100. In an embodiment, the host controller 1110 may run an application, an operating system (OS), etc. for controlling the computing system 1000. The host controller 1110 may run the application, the operating system, etc. based on data stored in the host memory 1120. For example, the host controller 1110 may include processors, interfaces, and graphic engines, which run the application, the operating system, etc. Also, the host controller 1110 may generate control signals for controlling the data control virtual machine 1130 and the read-ahead control module 1140, and may provide the control signals to the data control virtual machine 1130 and the read-ahead control module 1140.

In an embodiment, the host controller 1110 may communicate with the storage device 1200 using at least one of various communication standards or interfaces such as universal serial bus (USB), serial AT attachment (SATA), serial attached SCSI (SAS), high speed interchip (HSIC), small computer system interface (SCSI), peripheral component Interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM).

The host memory 1120 may function as a main memory, a working memory, a buffer memory or a cache memory of the host device 1100. The host memory 1120 may include a volatile memory such as DRAM or SRAM.

In an embodiment, under control of the host controller 1110, the host memory 1120 may store various types of information required for the operation of the host device 1100. For example, the host memory 1120 may store one or more programs and data related to the application, the operating system, etc.

In an embodiment, under control of the host controller 1110, the host memory 1120 may temporarily store data to be transmitted to the storage device 1200 or data received from the storage device 1200. For example, the host memory 1120 may load, from the storage device 1200, data related to the application, or the operating system, and may store the loaded data.

The data control virtual machine 1130 may run a program, e.g., a program implemented as an extended Berkeley Packet Filter (eBPF). The data control virtual machine 1130 may include instructions for controlling information related to the application or the operating system.

In an embodiment, information related to the application may include application identification information for identifying the application and information indicating whether files related to the application are successive (sequential) to each other. Further, the information related to the application may include file pointers, offsets, size information of files related to the application, and data size setting information corresponding to the application.

The read-ahead control module 1140 may run the program configured to control a read-ahead operation. In an embodiment, the read-ahead control module 1140 may include instructions for reading ahead pieces of data in the plurality of files stored in the storage device 1200, and for loading the read-ahead data into the host memory 1120, based on the information related to the application.

In an embodiment, the host controller 1110 may control the read-ahead operation on the plurality of files stored in the storage device 1200 by controlling the data control virtual machine 1130 and the read-ahead control module 1140. For example, the host controller 1110 may generate a first read command that instructs the data in a first file among the plurality of files to be read ahead in response to sequential read requests for the first file. Also, the host controller 1110 may determine whether to generate a second read command that instructs data in a second file, to be read ahead based on the information related to the application. Here, the data in the second file is successive to (or sequential to) the first file among the plurality of files. Further, the host controller 1110 may check the size of data to be read in response to the first read command based on the information related to the application.

In an embodiment, the data control virtual machine 1130 and the read-ahead control module 1140 may be implemented as hardware, software or a combination of hardware and software. In an example, each of the data control virtual machine 1130 and the read-ahead control module 1140 may be a circuit or a processor which operates depending on an algorithm, or a processor which executes a program. In another embodiment, unlike the embodiment illustrated in FIG. 1, each of the data control virtual machine 1130 and the read-ahead control module 1140 may be a program stored in the host memory 1120, and may be executed by the host controller 1110.

The storage device 1200 may store data, and may be a nonvolatile memory. For example, the storage device 1200 may include controllers for storing data, and working memories and nonvolatile memories of the controllers.

In an embodiment, the storage device 1200 may be manufactured as any of various types of storage devices depending on a scheme for communication with the host device 1100. Furthermore, the storage device 1200 may be manufactured in any of various types of package forms.

In an embodiment, the storage device 1200 may store data in the plurality of files related to the application.

Figure 2:
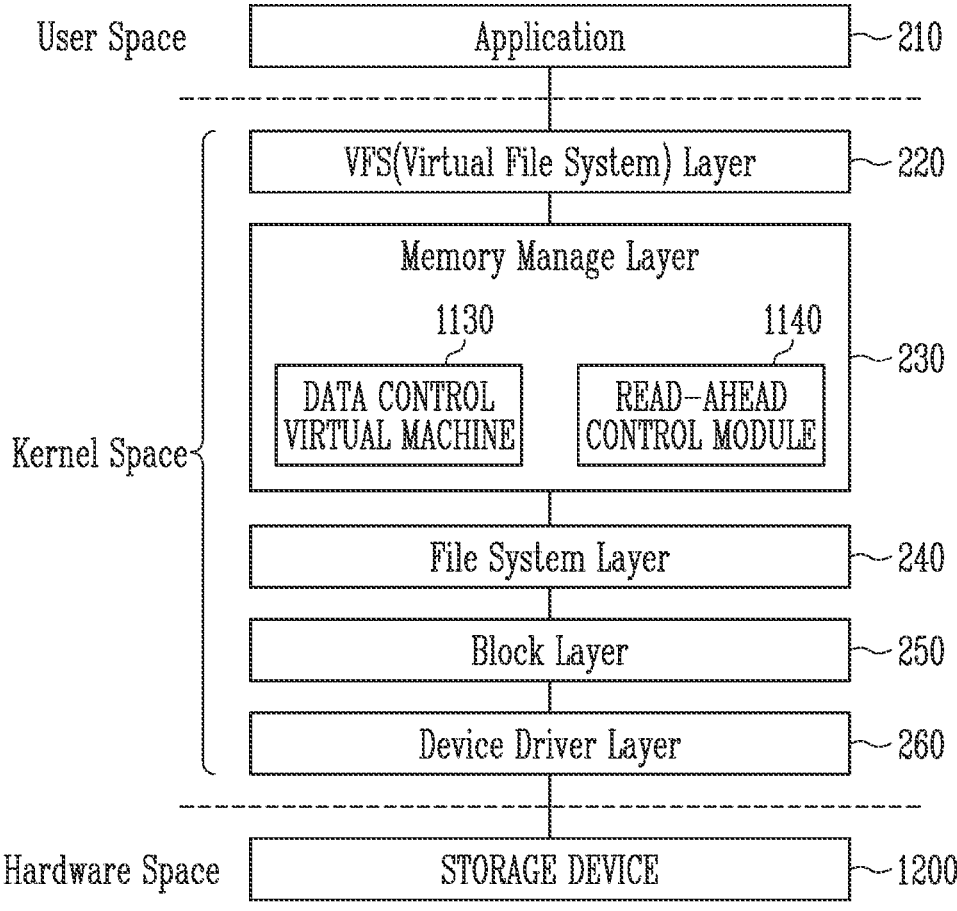
FIG. 2 is a diagram illustrating the software layer structure of a host device according to an embodiment of the present disclosure.

FIG. 2 is a diagram illustrating the software layer structure of a host device according to an embodiment of the present disclosure. Data, instructions, programs, etc. of the components included in the software layer structure illustrated in FIG. 2 may be stored in the host memory 1120 of FIG. 1. Further, the components illustrated in the software layer structure illustrated in FIG. 2 may be executed by the host controller 1110 of FIG. 1.

Referring to FIG. 2, the software layer structure of the host device 1100 may include a user space and a kernel space.

The user space may include an application 210. The application 210 may execute a normal user program run by an operating system.

The kernel space may include a virtual file system (VFS) layer 220, a memory manage layer 230, a file system layer 240, a block layer 250, and a device driver layer 260.

The virtual file system (VFS) layer 220 may allow one or more file system layers 240 to interact with each other. The virtual file system (VFS) layer 220 may use a standardized system call to perform a program operation or a read operation on different file system layers 240. That is, the virtual file system layer 220 may be an abstraction layer present between the application 210 and each file system layer 240.

The memory manage layer 230 may be a system for managing a memory, and may manage the memory so that the memory is shared among processors.

In an embodiment, the memory manage layer 230 may include a data control virtual machine 1130 and a read-ahead control module 1140.

The file system layer 240 may provide methods and functions of programming, reading, and using data. The file system layer 240 may perform a function of efficiently managing a file that is a set of data, and may provide fast data search and recovery, the support of a large amount of data, etc. The file system layer 240 is intended to improve the performance of the entire system by smoothly processing files and by reducing a bottleneck brought to the system by a storage medium having a processing speed less than that of a processor, such as a CPU. The file system layer 240 may divide the storage device 1200 into a plurality of logical blocks, and may be configured to, when at least one program request or read request is input to the storage device 1200, allocate the at least one program request or read request to one of the plurality of logical blocks and then execute the program request or read request on a per-logical block basis.

In an embodiment of the present disclosure, the file system layer 240 may perform data input/output on data on a block basis, wherein the block is implemented as a set of multiple bytes. However, such a data block may be referred to by another term indicating the input/output unit of data such as a cluster, a sector, or a page.

The block layer 250 may manage and schedule the input/output requests of the storage device 1200, such as a program request or a read request.

The device driver layer 260 may take charge of an interface between hardware and an operating system. The device driver layer 260 may be a program necessary for hardware to be normally operated under a specific operating system.

Figure 3:
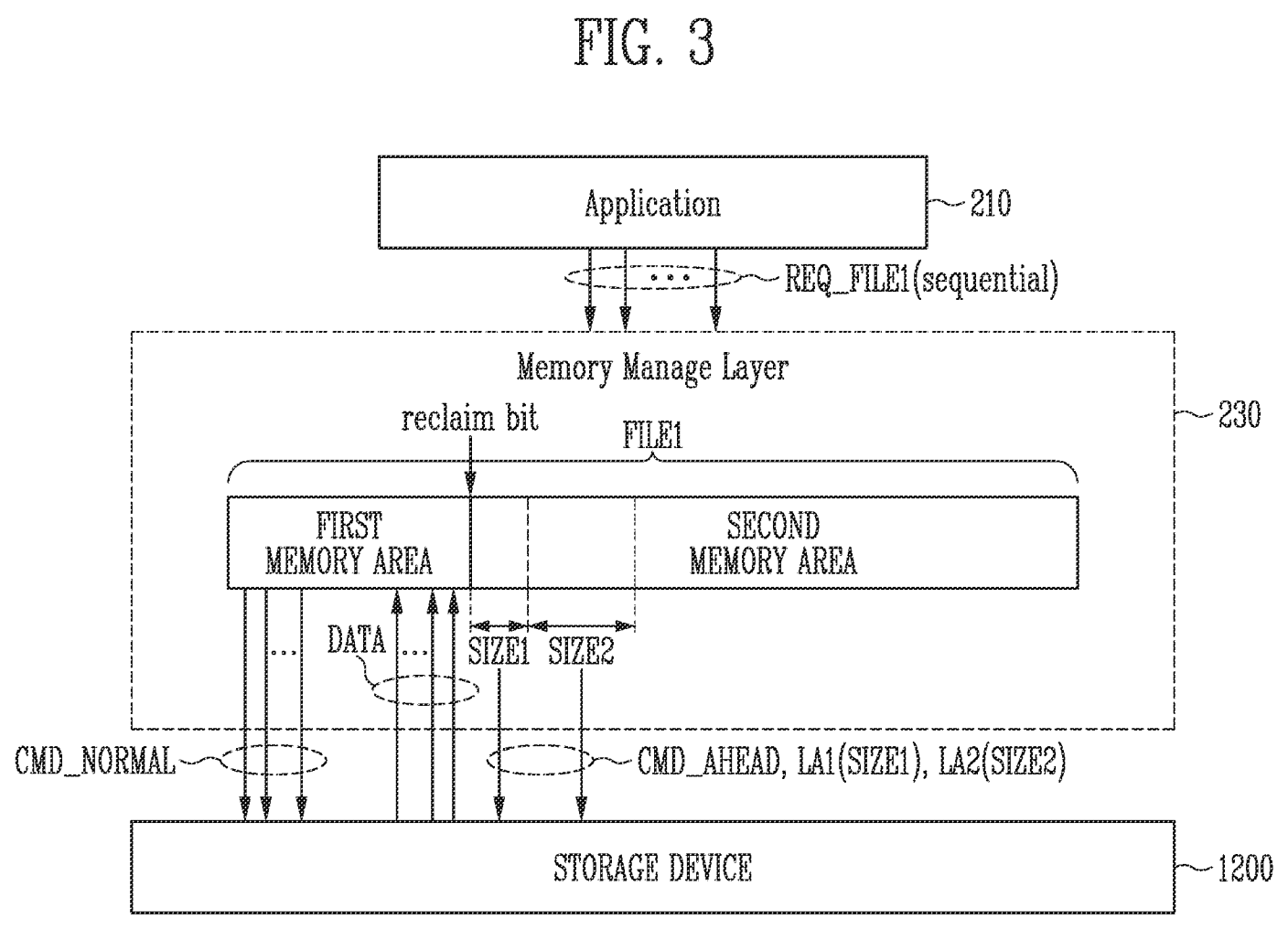

FIG. 3 is a diagram for describing a read-ahead operation according to an embodiment of the present disclosure. For convenience of description, in FIG. 3, description of the operations of the virtual file system layer 220, the file system layer 240, the block layer 250, and the device driver layer 260 of FIG. 2 will be omitted.

Referring to FIG. 3, the application 210 may generate read requests REQ_FILE1 for a first file FILE1.

The memory manage layer 230 may provide to a storage device 1200 normal read commands CMD_NORMAL for reading data in response to the read requests REQ_FILE1.

The storage device 1200 may provide data DATA to the memory manage layer 230 in response to the normal read commands CMD_NORMAL.

In an embodiment, the memory manage layer 230 may manage a host memory area in which the first file FILE1 is stored. The host memory area may include a first memory area and a second memory area. The first memory area may be an area for storing data pieces among pieces of data present in the first file FILE1, which are read from the storage device 1200 and loaded into the host memory 1120. The second memory area may be an empty area in which no data is present.

In an embodiment, the memory manage layer 230 may determine whether the read requests REQ_FILE1 for the first file FILE1 are sequential read requests, that is, whether the read requests REQ_FILE1 are successive. For example, the memory manage layer 230 may set a reclaim bit at a specific location in the second memory area. Here, when the first memory area reaches the reclaim bit, the memory manage layer 230 may determine that the read requests REQ_FILE1 for the first file FILE1 are successive.

In an embodiment, when the read requests REQ_FILE1 for the first file FILE1 are successive, the memory manage layer 230 may execute a read-ahead request that instructs data in the first file FILE1 to be read ahead regardless of the read request of the application 210. For example, the memory manage layer 230 may generate a read command CMD_AHEAD that instructs data having a first size SIZE1 to be read ahead. Further, the memory manage layer 230 may determine a logical address LA1 indicating the location of the storage area of the storage device 1200 in which the data having the first size SIZE1 is stored. The memory manage layer 230 may provide to the storage device 1200 the read command CMD_AHEAD and the logical address LA1. Furthermore, the memory manage layer 230 may generate a read command CMD_AHEAD that instructs data having a second size SIZE2 to be read ahead. Here, the second size SIZE2 may be greater than the first size SIZE1. That is, the memory manage layer 230 may generate the read commands CMD_AHEAD that instruct data having a gradually increasing size to be read ahead. The memory manage layer 230 may determine a logical address LA2 indicating the location of the storage area of the storage device 1200 in which the data having the second size SIZE2 is stored. The memory manage layer 230 may provide to the storage device 1200 the read command CMD_AHEAD and the logical address LA2.

FIG. 4 is a diagram illustrating a data control virtual machine 1130 according to an embodiment of the present disclosure.

Referring to FIG. 4, the data control virtual machine 1130 may include information SEQ INFO indicating files related to each other among a plurality of files. The data control virtual machine 1130 may check information about other files related to a file currently being read ahead based on the corresponding information SEQ_INFO.

The data control virtual machine 1130 may store application identification information PID and data size setting information SIZE INFO corresponding to the application 210. The data size setting information SIZE INFO may indicate the size of data required for each application at the time of making a read request. The data control virtual machine 1130 may receive the data size setting information SIZE INFO from the application and store the data size setting information SIZE INFO.

The data control virtual machine 1130 may store pieces of information related to a plurality of files FILE1_INFO to FILEn_INFO. The pieces of information related to the plurality of files FILE1_INFO to FILEn_INFO may include file pointers FP1 to FPn, offsets OFFSET1 to OFFSETn, and file sizes FSIZE1 to FSIZEn corresponding to respective files. A file pointer FP may indicate the starting logical address of a storage area within the storage device 1200 in which each file is stored. An offset OFFSET may indicate the length of a logical address read from the corresponding file pointer. Here, the offset may first have an initial value.

In an embodiment, the data control virtual machine 1130 may provide the read-ahead control module 1140 with a request REQ_FILE for identifying the location where a read-ahead operation is in progress for the file currently being read ahead. The data control virtual machine 1130 may acquire the file pointer FP, the offset OFFSET, and the size of the file FSIZE currently being read ahead from the read-ahead control module 1140 by providing the request.

In an embodiment, the data control virtual machine 1130 may provide to the read-ahead control module 1140 a control signal SIG_UPDATE for updating the information related to the file in the read-ahead control module 1140. In an example, the data control virtual machine 1130 may provide to the read-ahead control module 1140 information related to a target file among the pieces of information related to the plurality of files FILE1_INFO to FILEn_INFO, together with the control signal SIG_UPDATE. In this case, the read-ahead control module 1140 may change information related to an already stored file to the provided information related to the target file. In an example, the data control virtual machine 1130 may check the size of read data required by the application based on the data size setting information SIZE INFO. The data control virtual machine 1130 may provide to the read-ahead control module 1140 the checked read data size, together with the control signal SIG_UPDATE.

Figure 5A:
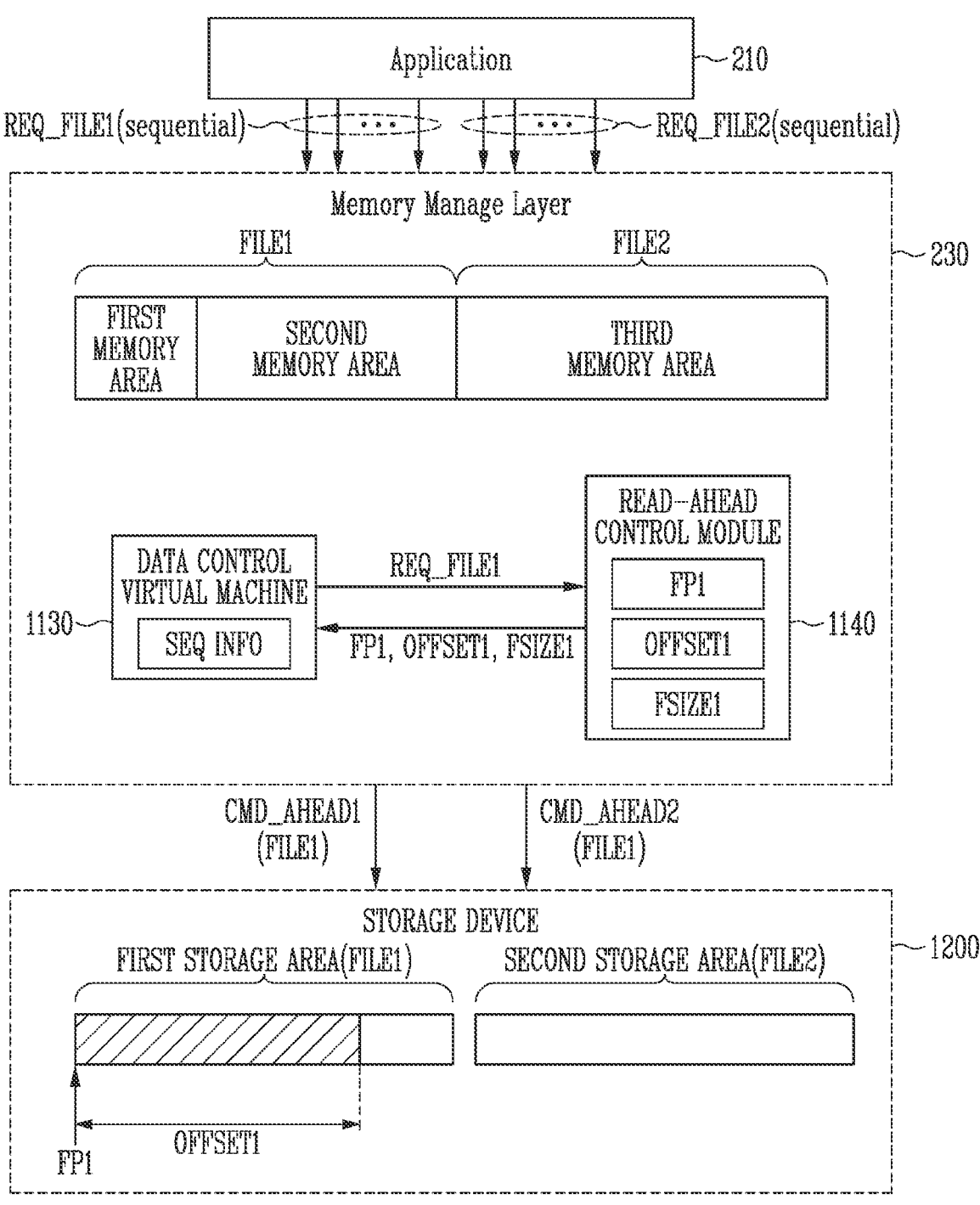
FIGS. 5A and 5B are diagrams for describing a read-ahead operation on successive files according to an embodiment of the present disclosure.
Figure 5B:
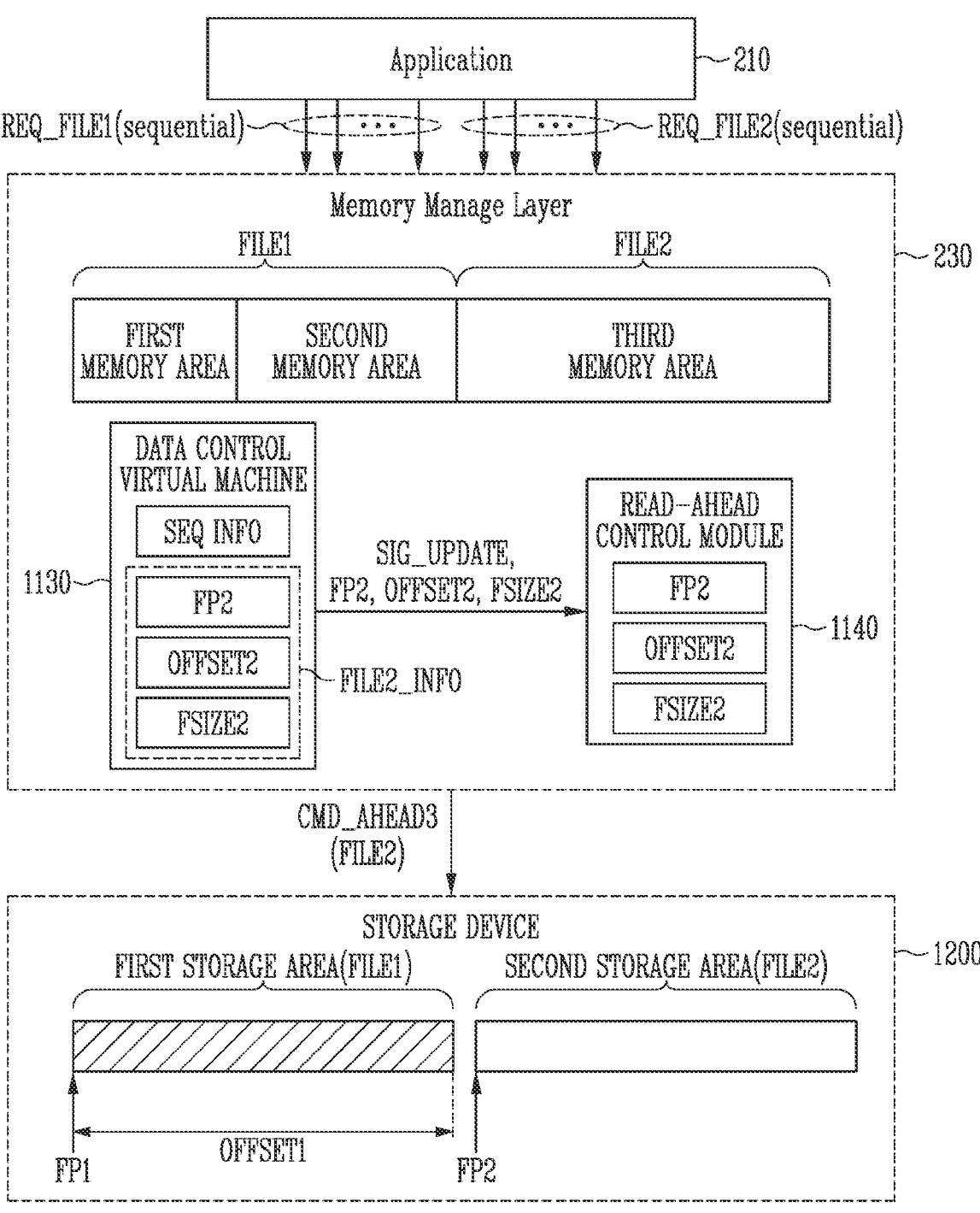

FIGS. 5A and 5B are diagrams for describing a read-ahead operation on successive files according to an embodiment of the present disclosure.

In detail, FIG. 5A is a diagram for describing a read-ahead request for a first file which is executed according to an embodiment of the present disclosure, and FIG. 5B is a diagram for describing a read-ahead request for a second file which is executed according to an embodiment of the present disclosure.

Referring to FIG. 5A, the application 210 may generate read requests REQ_FILE1 for data in a first file FILE1 among a plurality of files related to the application 210.

When the read requests REQ_FILE1 for the data in the first file FILE1 are successive, the memory manage layer 230 may generate a first read command CMD_AHEAD1 that instructs second data to be read ahead. Second data may be successive to first data corresponding to the read requests REQ_FILE1 among pieces of data in the first file FILE1.

The memory manage layer 230 may provide the first read command CMD_AHEAD1 to the storage device 1200.

In an embodiment, the memory manage layer 230 may manage a host memory area in which the first file FILE1 is stored and a host memory area in which the second file FILE2 is stored. The host memory area in which the first file FILE1 is stored may include a first memory area and a second memory area. The first memory area may be an area for storing data piece, which are read from the storage device 1200 and loaded into the host memory 1120, among pieces of data in the first file FILE1. The second memory area may be an empty area in which no data is present. The host memory area in which the second file FILE2 is stored may include a third memory area. The third memory area may be an empty area in which no data is present.

In an embodiment, the data control virtual machine 1130 may store information SEQ INFO indicating that the first file FILE1 and the second file FILE2 are associated with each other. Accordingly, the memory manage layer 230 may ascertain that the information indicating that the first file FILE1 and the second file FILE2 are successive to each other based on the corresponding information SEQ INFO, and may execute a read-ahead request for the second file FILE2 when the read-ahead request for the first file FILE1 is completed.

In an embodiment, the read-ahead control module 1140 may store a first file pointer FP1, a first offset OFFSET1, and a first file size FSIZE1. The first file pointer FP1 may indicate the starting logical address of the first storage area within the storage device 1200 in which the first file FILE1 is stored. The first offset OFFSET1 may indicate the length of a logical address corresponding to the first read command CMD_AHEAD1. For example, the read-ahead control module 1140 may set, as the first offset OFFSET1, the length of the logical address, corresponding to data read in response to the sequential read requests and data to be read in response to the first read command CMD_AHEAD1. That is, the read-ahead control module 1140 may set, as the first offset OFFSET1, the length of the logical address corresponding to the size of the data to be read in response to a read command whenever the read command for the data in the first file FILE1 is transmitted to the storage device 1200.

For example, the read-ahead control module 1140 may identify the location at which data is instructed to be currently read ahead based on the first file pointer FP1 and the first offset OFFSET1, and may determine a logical address corresponding to data to be subsequently read ahead based on the identified location. Further, the read-ahead control module 1140 may check the last logical address of the storage area within the storage device 1200 in which the first file FILE1 is stored, based on the first file size FSIZE1.

In an embodiment, the memory manage layer 230 may determine whether the read-ahead request for the first file FILE1 has been completed, based on the first file pointer FP1 and the first offset OFFSET1 which correspond to the first storage area within the storage device 1200 in which the first file FILE1 is stored.

For example, the data control virtual machine 1130 may provide the read-ahead control module 1140 with a request REQ_FILE1 for identifying the location where a read-ahead operation is in progress for the first file FILE1. The read-ahead control module 1140 may provide to the data control virtual machine 1130 the first file pointer FP1, the first offset OFFSET1, and the first file size FSIZE1 in response to the received request REQ_FILE1. The data control virtual machine 1130 may acquire from the read-ahead control module 1140 the first file pointer FP1, the first offset OFFSET1, and the first file size FSIZE1. The data control virtual machine 1130 may check the starting logical address of the first storage area based on the first file pointer FP1. The data control virtual machine 1130 may check the last logical address of the first storage area based on the starting logical address and the first file size FSIZE1. The data control virtual machine 1130 may determine whether a logical address moved from the starting logical address by the first offset OFFSET1 indicates the last logical address.

In an embodiment, when the logical address moved from the starting logical address by the first offset OFFSET1 does not indicate the last logical address, the data control virtual machine 1130 may determine that the read-ahead request for the first file FILE1 has not been completed.

In this case, the read-ahead control module 1140 may continue to execute the read-ahead requests for the first file FILE1. For example, the read-ahead control module 1140 may generate a second read command CMD_AHEAD2 that instructs data to be read ahead. The instructed data may be successive to the data read in response to the first read command CMD_AHEAD1 among pieces of data in the first file. The second read command CMD_AHEAD2 may be provided to the storage device 1200.

Referring to FIG. 5B, in response to the case where the logical address moved from the starting logical address by the first offset OFFSET1 indicates the last logical address, the data control virtual machine 1130 may determine that the read-ahead request for the first file FILE1 has been completed.

In an embodiment, the data control virtual machine 1130 may provide the read-ahead control module 1140 with a control signal SIG_UPDATE for updating the first file pointer FP1, the first offset OFFSET1, and the first file size FSIZE1, which are stored in the read-ahead control module 1140, to information related to the second file.

For example, the data control virtual machine 1130 may provide to the read-ahead control module 1140 a second file pointer FP2, a second offset OFFSET2, and a second file size FSIZE2, together with the control signal SIG_UPDATE. The second file pointer FP2 may indicate the starting logical address of the second storage area within the storage device 1200 in which the second file FILE2 is stored. The second offset OFFSET2 may have an initialized value. The read-ahead control module 1140 may change the first file pointer FP1 to the second file pointer FP2 in response to the control signal SIG_UPDATE. Further, the read-ahead control module 1140 may change the first offset OFFSET1 to the second offset OFFSET2 in response to the control signal SIG_UP-DATE. Furthermore, the read-ahead control module 1140 may change the first file size FSIZE1 to the second file size FSIZE2 in response to the control signal SIG_UPDATE. Accordingly, the read-ahead control module 1140 may store the second file pointer FP2, the second offset OFFSET2, and the second file size FSIZE2.

In an embodiment, the read-ahead control module 1140 may execute the read-ahead request for the second file FILE2 in response to the completion of the read-ahead request for the first file FILE1.

In an embodiment, the read-ahead control module 1140 may generate a third read command CMD_AHEAD3 that instructs data in the second file FILE2 to be read ahead from a logical address indicated by the second file pointer FP2. The generated third read command CMD_AHEAD3 may be provided to the storage device 1200.

In an embodiment, after the third read command CMD_AHEAD3 is provided to the storage device 1200, the read-ahead control module 1140 may set, as the second offset OFFSET2, the length of the logical address corresponding to the third read command CMD_AHEAD3. That is, the read-ahead control module 1140 may set, as the second offset OFFSET2, the length of the logical address, corresponding to the size of data to be read in response to the third read command CMD_AHEAD3.

Figure 6:
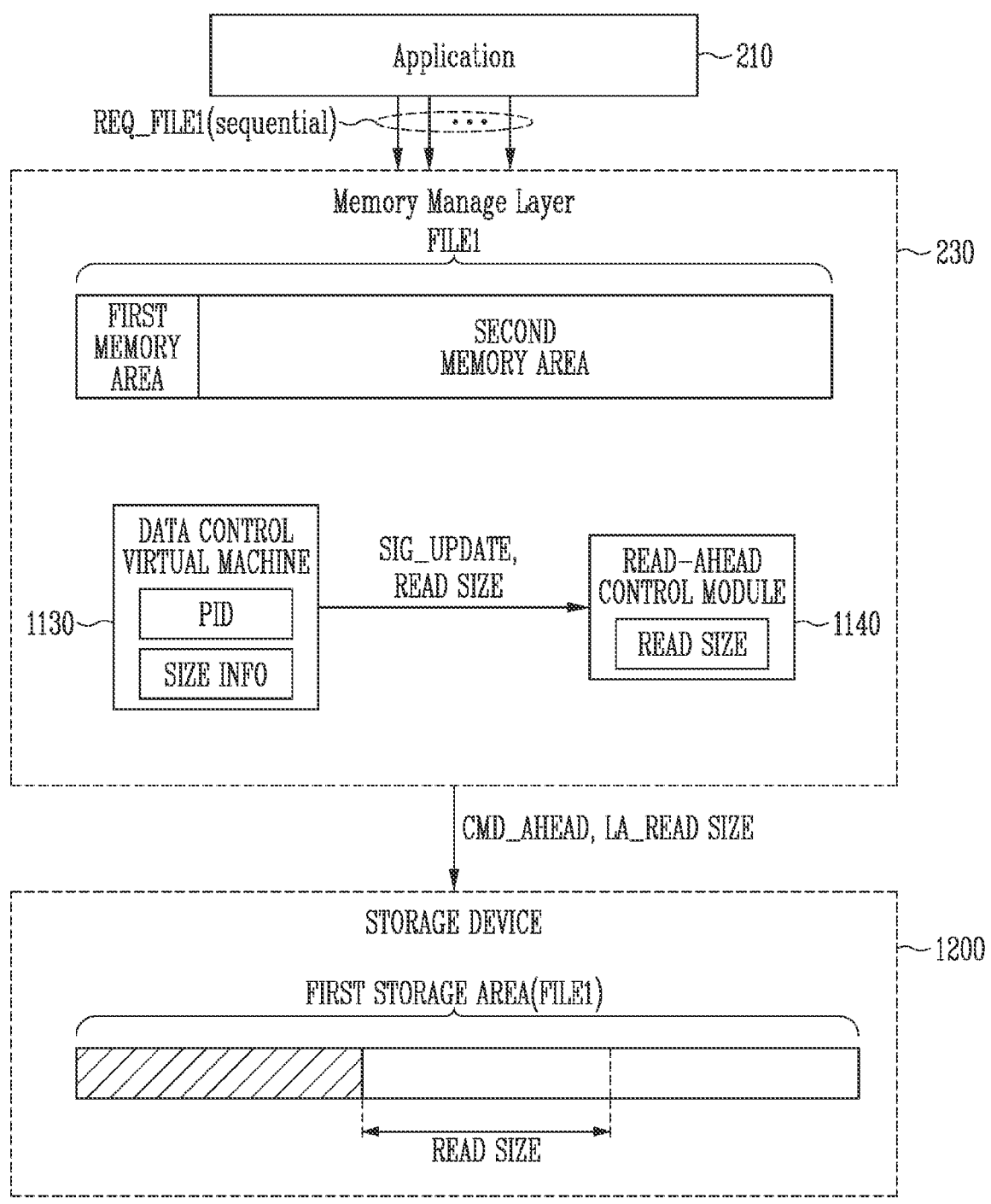
FIG. 6 is a diagram illustrating that the size of data to be read by a read-ahead operation is determined according to an embodiment of the present disclosure.

FIG. 6 is a diagram illustrating that the size of data to be read by a read-ahead operation is determined according to an embodiment of the present disclosure.

Referring to FIG. 6, the data control virtual machine 1130 may store application identification information PID and data size setting information SIZE INFO corresponding to the application 210 in association with each other. The data size setting information SIZE INFO may indicate the size of data required by the application 210.

In an embodiment, the application 210 may generate read requests REQ_FILE1 for data in a first file FILE1 among a plurality of files related to the application 210.

When read requests REQ_FILE1 for the data in the first file FILE1 are successive, the memory manage layer 230 may generate a read command CMD_AHEAD that instructs data to be read ahead. The instructed data may be successive to data corresponding to the read requests REQ_FILE1 among pieces of data in the first file FILE1.

In an embodiment, the data control virtual machine 1130 may check the data size setting information SIZE INFO corresponding to the application 210 based on the application identification information PID. For example, the data control virtual machine 1130 may determine whether the application 210 is a preset application based on the application identification information PID.

In an embodiment, when it is determined that the application 210 is the preset application, the data control virtual machine 1130 may control the read-ahead control module 1140 to update the size of read data READ SIZE to be read in response to the read command CMD_AHEAD depending on the data size setting information SIZE INFO. For example, the data control virtual machine 1130 may provide the read-ahead control module 1140 with a control signal SIG_UPDATE for updating the size of read data READ SIZE checked depending on the data size setting information SIZE INFO. The read-ahead control module 1140 may store the size of read data READ SIZE in response to the control signal SIG_UPDATE.

In an embodiment, the read-ahead control module 1140 may determine a logical address LA_READ SIZE corresponding to the read command CMD_AHEAD based on the data size setting information SIZE INFO. For example, the read-ahead control module 1140 may determine the length of the logical address LA_READ SIZE so that the size of data to be read in response to the read command CMD_A-HEAD is the size READ SIZE based on the data size setting information SIZE INFO.

The logical address LA_READ SIZE and the read command CMD_AHEAD may be provided to the storage device 1200.

Figure 7:
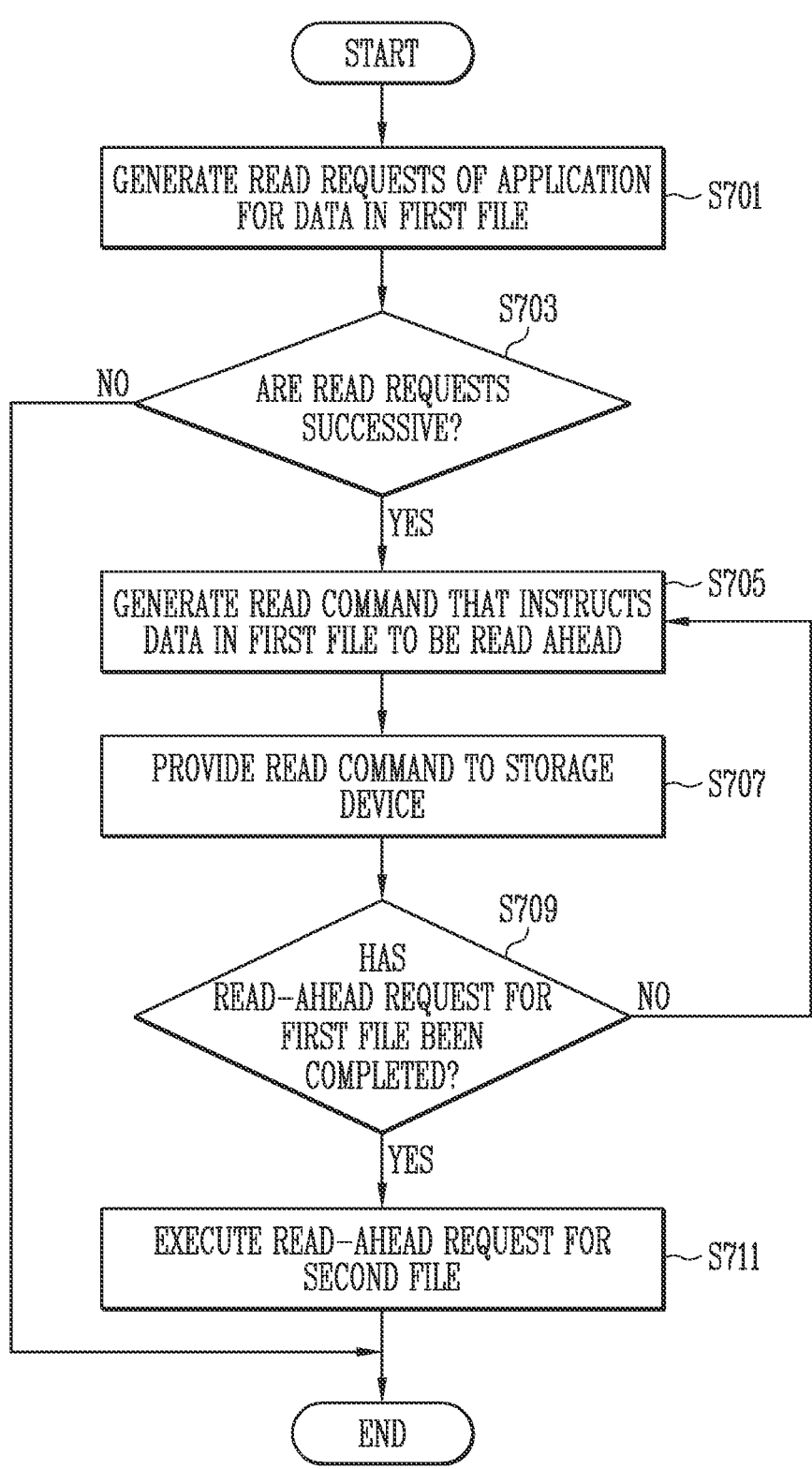
FIG. 7 is a flowchart illustrating a method of operating a host device according to an embodiment of the present disclosure.

FIG. 7 is a flowchart illustrating a method of operating a host device according to an embodiment of the present disclosure.

The method illustrated in FIG. 7 may be performed by, for example, the host device 1100 illustrated in FIG. 1.

At operation S701, the host device 1100 may generate read requests for data in a first file among a plurality of files related to an application.

At operation S703, the host device 1100 may determine whether read requests for the data in the first file are successive.

When it is determined at operation S703 that the read requests for the data in the first file are successive, the host device 1100 may generate a read command that instructs the data in the first file to be read ahead at operation S705. For example, the host device 1100 may generate a read command that instructs second data to be read ahead. The second data may be successive to the first data corresponding to the read requests among pieces of data in the first file.

At operation S707, the host device 1100 may provide the read command to the storage device 1200.

At operation S709, the host device 1100 may determine whether a read-ahead request for the first file has been completed, based on a first file pointer and a first offset which correspond to a storage area within the storage device in which the first file is stored.

When it is determined at operation S709 that the read-ahead request for the first file has been completed, the host device 1100 may execute a read-ahead request for the second file among a plurality of files at operation S711.

When it is determined at operation S709 that the read-ahead request for the first file has not been completed, the host device 1100 may generate a read command that instructs third data to be read ahead at operation S705. The third data may be successive to the first data and the second data.

Figure 8:
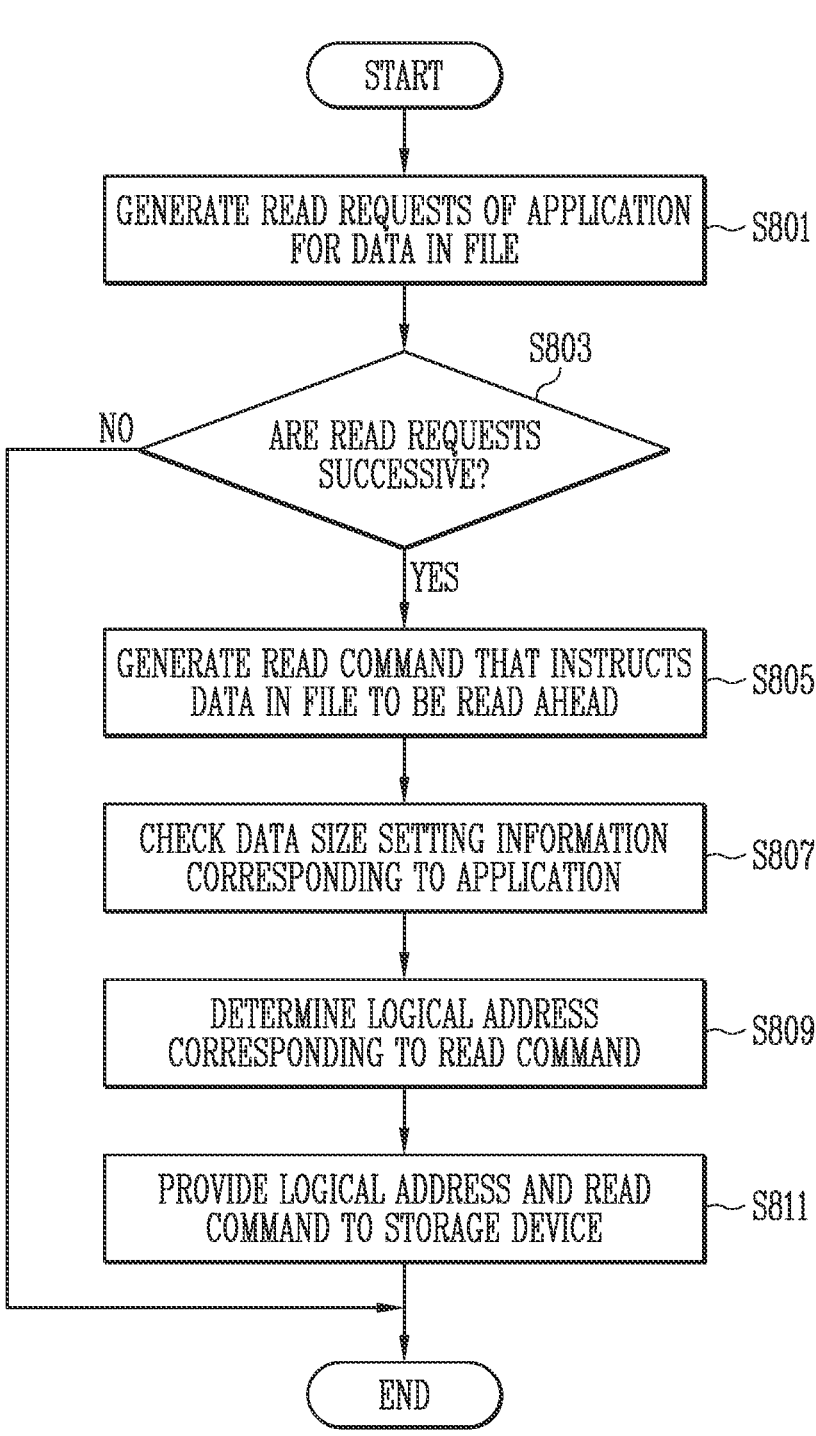
FIG. 8 is a flowchart illustrating a method of operating a host device according to an embodiment of the present disclosure.

FIG. 8 is a flowchart illustrating a method of operating a host device according to an embodiment of the present disclosure.

The method illustrated in FIG. 8 may be performed by, for example, the host device 1100 illustrated in FIG. 1.

At operation S801, the host device 1100 may generate read requests for data in a file related to an application.

At operation S803, the host device 1100 may determine whether read requests for the data in the file are successive.

When it is determined at operation S803 that the read requests for the data in the file are successive, the host device 1100 may generate a read command that instructs data to be read ahead at operation S805. The instructed data may be successive to data corresponding to the read requests.

At operation S807, the host device 1100 may check data size setting information corresponding to the application based on application identification information.

At operation S809, the host device 1100 may determine a logical address corresponding to the read command based on the data size setting information.

At operation S811, the host device 1100 may provide the logical address and the read command to the storage device 1200.

According to the present disclosure, there are provided a host device having improved read-ahead operation performance, a method of operating the host device, and a computing system including the host device.

What is claimed is:

1. A computing system comprising:
a storage device configured to store a plurality of files related to an application and output data related to at least one of the plurality of files in response to a read command; and
a host device configured to temporarily store the data output from the storage device and execute the application based on the data,
wherein the host device is configured to, in response to a sequential read request for a first file among the plurality of files, provide the storage device with a first read command and a second read command, and
wherein the first read command instructs data in the first file to be read ahead based on first information related to the application, and the second read command instructs data in a second file successive to the first file among the plurality of files to be read ahead.

2. The computing system according to claim 1, wherein the host device comprises:
a data control virtual machine configured to control the first information related to the application; and
a read-ahead control module configured to control a read-ahead operation of reading ahead pieces of data in the plurality of files based on the first information related to the application.

3. The computing system according to claim 2, wherein the data control virtual machine stores second information indicating that the first file and the second file are associated with each other.

4. The computing system according to claim 3, wherein the read-ahead control module stores a first file pointer, a first offset, and a size of the first file, the first file pointer indicating a starting logical address of a storage area within the storage device in which the first file is stored, and the first offset indicating a length of a logical address corresponding to the first read command.

5. The computing system according to claim 4, wherein the data control virtual machine is configured to acquire, from the read-ahead control module, the first file pointer, the first offset, and the size of the first file and is configured to, when a logical address moved from the first file pointer by the first offset indicates a last logical address of the storage area corresponding to the size of the first file, provide the read-ahead control module with a second file pointer, an initialized second offset, and a size of the second file, the second file pointer indicating a starting logical address of a storage area within the storage device in which the second file is stored.

6. The computing system according to claim 5, wherein the read-ahead control module is configured to store the second file pointer, the second offset, and the size of the second file, generate the second read command based on the second file pointer and the second offset, and provide the second read command to the storage device.

7. The computing system according to claim 2, wherein the data control virtual machine stores application identification information and data size setting information corresponding to the application.

8. The computing system according to claim 7, wherein the data control virtual machine is configured to, when the application is determined to be a preset application based on the application identification information, provide the data size setting information to the read-ahead control module.

9. The computing system according to claim 8, wherein the read-ahead control module is configured to determine a logical address corresponding to the first read command or the second read command so that a size of data to be read in response to the first read command or the second read command is the same as a size based on the data size setting information, and to provide the logical address to the storage device.

* * * * *